US007496910B2

(12) United States Patent
Voskuil

(10) Patent No.: US 7,496,910 B2
(45) Date of Patent: Feb. 24, 2009

(54) SYSTEM FOR POLICY-BASED MANAGEMENT OF SOFTWARE UPDATES

(75) Inventor: Eric K. Voskuil, Somersworth, NH (US)

(73) Assignee: DesktopStandard Corporation, Portsmouth, NH (US)

( * ) Notice: Subject to any disclaimer, the term of this patent is extended or adjusted under 35 U.S.C. 154(b) by 536 days.

(21) Appl. No.: 11/081,904

(22) Filed: Mar. 15, 2005

(65) Prior Publication Data

US 2005/0262076 A1 Nov. 24, 2005

Related U.S. Application Data

(60) Provisional application No. 60/573,482, filed on May 21, 2004.

(51) Int. Cl.
*G06F 9/44* (2006.01)
(52) U.S. Cl. .................. 717/168; 717/169; 717/170; 717/171; 717/172; 717/173
(58) Field of Classification Search ......... 717/168–178, 717/121; 707/3, 10
See application file for complete search history.

(56) References Cited

U.S. PATENT DOCUMENTS

| 5,581,764 | A | * | 12/1996 | Fitzgerald et al. | ........... 717/121 |
|---|---|---|---|---|---|
| 6,199,204 | B1 | * | 3/2001 | Donohue | ..................... 717/178 |
| 6,202,207 | B1 | * | 3/2001 | Donohue | ..................... 717/173 |
| 6,209,128 | B1 | * | 3/2001 | Gerard et al. | ............... 717/170 |
| 6,345,386 | B1 | * | 2/2002 | Delo et al. | .................. 717/176 |
| 6,418,554 | B1 | * | 7/2002 | Delo et al. | .................. 717/174 |
| 6,466,932 | B1 | * | 10/2002 | Dennis et al. | .................. 707/3 |
| 6,523,166 | B1 | * | 2/2003 | Mishra et al. | ............... 717/174 |
| 6,836,794 | B1 | * | 12/2004 | Lucovsky et al. | ........... 717/177 |
| 6,996,818 | B2 | * | 2/2006 | Jacobi et al. | ................. 717/170 |
| 7,251,812 | B1 | | 7/2007 | Jhanwar et al. | |
| 2002/0178249 | A1 | | 11/2002 | Prabakaran et al. | |
| 2006/0031226 | A1 | * | 2/2006 | Cope et al. | ..................... 707/10 |
| 2006/0265708 | A1 | * | 11/2006 | Blanding et al. | ........... 717/174 |
| 2007/0220068 | A1 | | 9/2007 | Thompson et al. | |

OTHER PUBLICATIONS

Bodnar, et al. "Windows 2000 Deployment Overview at the University of Colorado at Boulder", 2000, ACM, p. 8-13.*
Nguyen, et al. "NT/Windows 2000 User Profile Issues", 2001, ACM, p. 120-122.*
Judy, et al. "Windows 2000 Deployment Technical Challenges at the University of Colorado at Boulder", 2000, ACM, p. 141-145.*

* cited by examiner

*Primary Examiner*—Wei Y Zhen
*Assistant Examiner*—Qamrun Nahar
(74) *Attorney, Agent, or Firm*—Senniger Powers LLP

(57) ABSTRACT

A computer system configured for policy-based management of software updates is disclosed. The system maintains group-policy objects, with which groups of computers are associated. The system obtains identities of software updates from a source of software updates. The system also obtains filter criteria for each update, for determining whether the update should be applied to a particular computer or not. The system assigns newly available updates to respective selected group-policy objects and adds the obtained filter criteria to each such group-policy object. The system performs necessary installations of updates by, for each group-policy object, determining whether, for each combination of a computer belonging to a group associated with that policy object and an update assigned to that policy object, the computer satisfies the filter criteria for the update, and if so, applying the update to that computer, but if not, refraining from applying the update.

9 Claims, 4 Drawing Sheets

SYSTEM FOR POLICY-BASED MANAGEMENT OF SOFTWARE UPDATES

CROSS-REFERENCE TO RELATED APPLICATION

The present application claims the benefit of U.S. Provisional Patent Application Ser. No. 60/573,482, which was filed on May 21, 2004, by Eric Voskuil for Systems and Methods for Policy-Based Management, and is hereby incorporated by reference.

BACKGROUND OF THE INVENTION

1. Field of the Invention

The disclosed methods and systems relate generally to management of software updates, and more particularly to methods and systems for managing software updates through a group/policy management system.

2. Background Information

Software is in an almost constant state of flux. Programmers modify software for a number of reasons, including changing features to meet the new needs of their users, adapting programs to work with new and/or modified hardware and/or other software, and repairing errors as they are discovered, among many others. Requiring their users to purchase new versions of existing software every time a vendor changes a software product, however minor the change may be, is not efficient or practical. Instead, vendors release software updates, sometimes called patches, to the users of their software. A software update contains code that effects a change or changes in the software. Software updates are particularly necessary to repair security holes in software products, such as operating systems, that make users' computers potentially vulnerable to attack by hackers, viruses, worms and the like. In such a scenario, the necessary updates may vary from computer to computer on a LAN, depending on the type of operating system running on each computer and how frequently it has been updated in the past. Thus, a system for managing software updates across a network of varied computers would be useful.

In WINDOWS®, a Group Policy Object (GPO) is a collection or grouping of configuration settings that are applied to computer users and/or computers/systems automatically and/or remotely. Group Policy is a MICROSOFT® implementation of the general concept of policy-based management, which is a computer management model similar to Object Oriented Programming in the realm of software development. One potential implementation of a group policy system is described in U.S. Pat. No. 6,466,932. By applying the configuration settings to the computers/systems, a system administrator or other can define and/or determine the behavior and/or "appearance"/configuration of the computers/users. Accordingly, a GPO is generally configured by a system administrator or other high-level administrator, and as an object, a GPO can be associated with a hierarchical grouping known as a "container." A container may be a domain, a site, an organization unit (OU), or other association of computers/systems/users. In some example instances, a GPO may define script options, security options, software-installation options, folder-redirection options, software-maintenance options, and other configuration options.

Each GPO has an Access Control List (ACL) that controls whether the GPO's settings are applied to given users, groups, and/or computers. An entity that is on the ACL has the GPO's settings applied to it. An entity not on the ACL does not, at least in response to that GPO. In this manner, GPOs may be applied based on a user/computer's group membership, and this capability may be referred to as GPO-level filtering. Accordingly, GPO-level filtering allows a system administrator or another to specify whether a GPO is applied or denied to users/computers. The GPO is thus applied in its entirety, or denied in its entirety, to a user/computer/system.

In a MICROSOFT® WINDOWS® implementation, GPOs are populated with settings by extensions or plug-ins to a Group Policy Object Editor (GPOE). Settings are actually applied on client computers by corresponding extensions, called Client-Side Extensions (CSEs). The reporting system (Resultant Set of Policy, or RSoP) is part of the model, and uses another extensible component, called the RSoP snap-in. There is a documented extension model that MICROSOFT® provides for software vendors to extend all three systems and, by doing so, provide new functionality within the WINDOWS® Group Policy architecture.

SUMMARY OF THE INVENTION

In an embodiment of the invention, there is provided a computer system that is software-configured to maintain group-policy objects with which groups of computers are associated. The system is further software-configured to obtain from a source of software updates the identities of software updates that are newly available, and for respective ones of such updates, obtain corresponding update filter criteria for determining whether a computer includes software for which those updates are intended and for determining whether the updates have already been applied. The system is further software-configured to assign such newly available updates to respective selected ones of the group-policy objects and to add, to each group-policy object to which an update has thus been assigned, the filter criteria obtained for that update. The system is further software-configured to perform necessary installations of such updates by, for each of at least one such group-policy object, determining, for each combination of (a) computer belonging to a group associated with that group-policy object and (b) update assigned to that group-policy object, whether that computer satisfies filter criteria that include the update filter criteria obtained from the source for that update, and if so, applying that update to that computer; and if not, refraining from applying that update to that computer.

In a related embodiment, each group-policy object may include a separate policy for each update that has been assigned to that group-policy object. In a further related embodiment, the computer system may be further software configured to respond to user input to add to the filter criteria at least one user-defined filter criterion. In yet another further related embodiment, if a computer satisfies the filter criteria for an update, the update that is applied to that computer may be retrieved from a local repository.

In another related embodiment, the computer system may be software configured to respond to user input to trigger the assignment of such newly available updates to respective selected ones of group-policy objects. In yet another related embodiment, the computer system may be software configured to respond to user input to trigger obtaining from a source of software updates the identities of software updates that are newly available, and for respective ones of such updates, obtaining corresponding update filter criteria for determining whether a computer includes software for which those updates are intended and for determining whether the updates have already been applied.

In still another related embodiment, the computer system may be further software configured to respond to user input to add to the filter criteria at least one user-defined filter criterion. In yet still another related embodiment, the computer system may be software configured to further obtain from the source of software updates metadata describing each newly available software update.

In yet another related embodiment, if a computer satisfies the filter criteria for an update, the update that is applied to that computer may be retrieved from a local repository.

BRIEF DESCRIPTION OF THE DRAWINGS

The invention description below refers to the accompanying drawings, of is which.

DETAILED DESCRIPTION OF AN ILLUSTRATIVE EMBODIMENT

Figure 1:
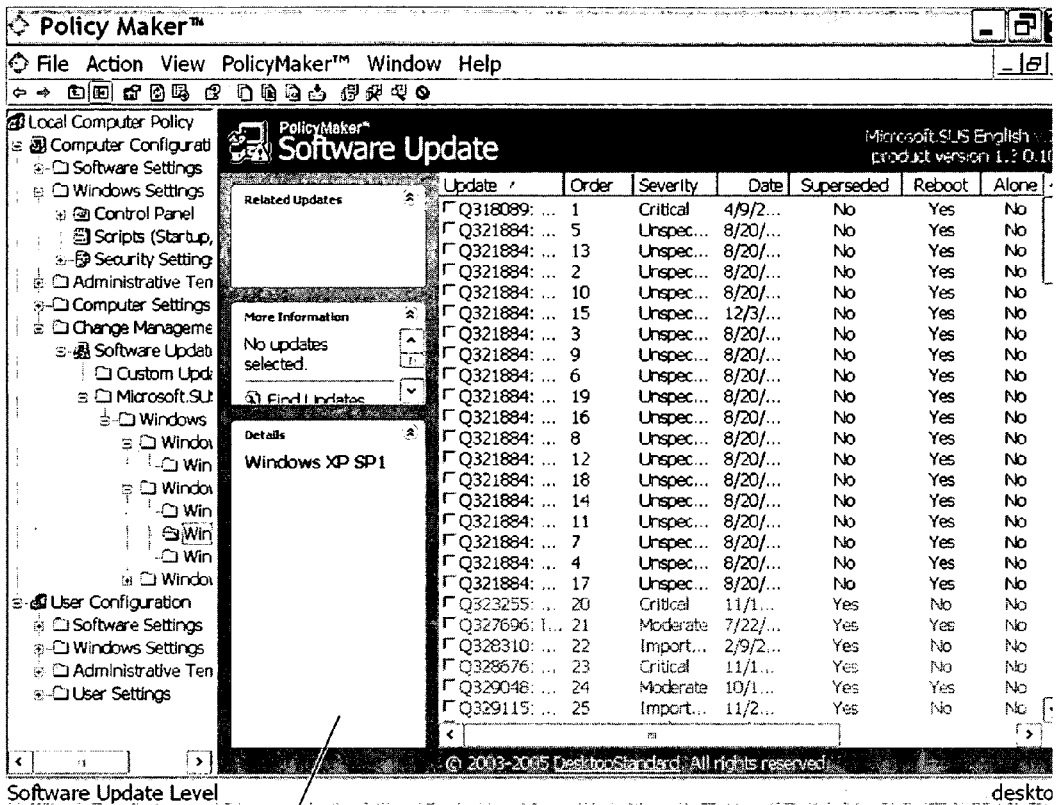
FIG. 1 is a graphical user interface of the software update management system described herein.

To provide an overall understanding, certain illustrative embodiments will now be described; however, it will be understood by one of ordinary skill in the art that the systems and methods described herein may be adapted and modified to provide systems and methods for other suitable applications and that other additions and modifications may be made without departing from the scope of the systems and methods described herein.

Unless otherwise specified, the illustrated embodiments may be understood as providing exemplary features of varying detail of certain embodiments, and therefore, unless otherwise specified, features, components, modules, and/or aspects of the illustrations may be otherwise combined, separated, interchanged, and/or rearranged without departing from the disclosed systems or methods. Additionally, the shapes and sizes of components are also exemplary and unless otherwise specified, may be altered without affecting the scope of the disclosed and exemplary systems or methods of the present disclosure.

The disclosed methods and systems relate to management of software updates through a group/policy management system, where WINDOWS® GPO management is provided herein as an example of such a policy management system. However, the disclosed methods and systems are not limited to such an example embodiment, and may be understood to apply to other group and/or policy-based management systems and techniques.

Extensible group/policy management systems, such as WINDOWS® Group Policy, standardize the locations where policy settings are stored and standardize synchronization systems for policy settings and reporting. However, such systems do not standardize a format for storing such values in those locations. This results in a lack of standardization between extensions that are often provided by various vendors. Even from a single vendor, such as MICROSOFT® in the base implementation of WINDOWS® Group Policy, there is no format standardization between Group Policy extensions. As a result, Group Policy management tools are complicated by the need to understand the proprietary settings formats for each extension implementation.

The illustrated system includes standardized formats for policy-settings values and for reporting on policy setting processing. The standardization enables these values to be handled in an abstract manner. So, rather than providing a different interface for each policy type to match the format of that policy type, the illustrated system may employ a common system/user interface that is applicable to all policy types in the same manner, while still supporting uniqueness of different policy types. Further, the data formats (e.g., XML schema) may be the same for all policy types, thereby making settings data portable (e.g., drag/drop, cut/paste, import/export) and the system extensible by third parties.

The disclosed methods and systems also include a set of common features for various policy extensions. These features include the ability to document each policy setting, per-setting filtering options, error handling, security context, and policy processing options. Policy processing options include the option to disable a policy without deleting it, remove a policy if it is no longer applied to the user/computer, and apply the policy to the user/computer one time only, thereby making it a preference setting. These standardized options allow for rapid learning of the system across multiple independent extensions, as well as an expectation for common behavior.

The disclosed methods and systems further include a generalized filtering system that allows per-policy filters to be handled in an abstract manner, such that rather than including a setting/feature on an individual policy type, the disclosed methods and systems employ a common system/user interface that is applicable to all policy types in the same manner. Further, the data formats (e.g., XML schema) may be the same for all policy types, thereby making filter data portable (e.g., drag/drop, cut/paste, import/export) and the system extensible by third parties. Further, the filters may be processed by common code for multiple policy types, and behavior is common and therefore predictable to system administrators. The disclosed methods and systems thus contemplate a reporting implementation (e.g., XSL transformation) that may be common for policy types, and centralized documentation (e.g., one set of help topics for a common filter system).

Figure 2:
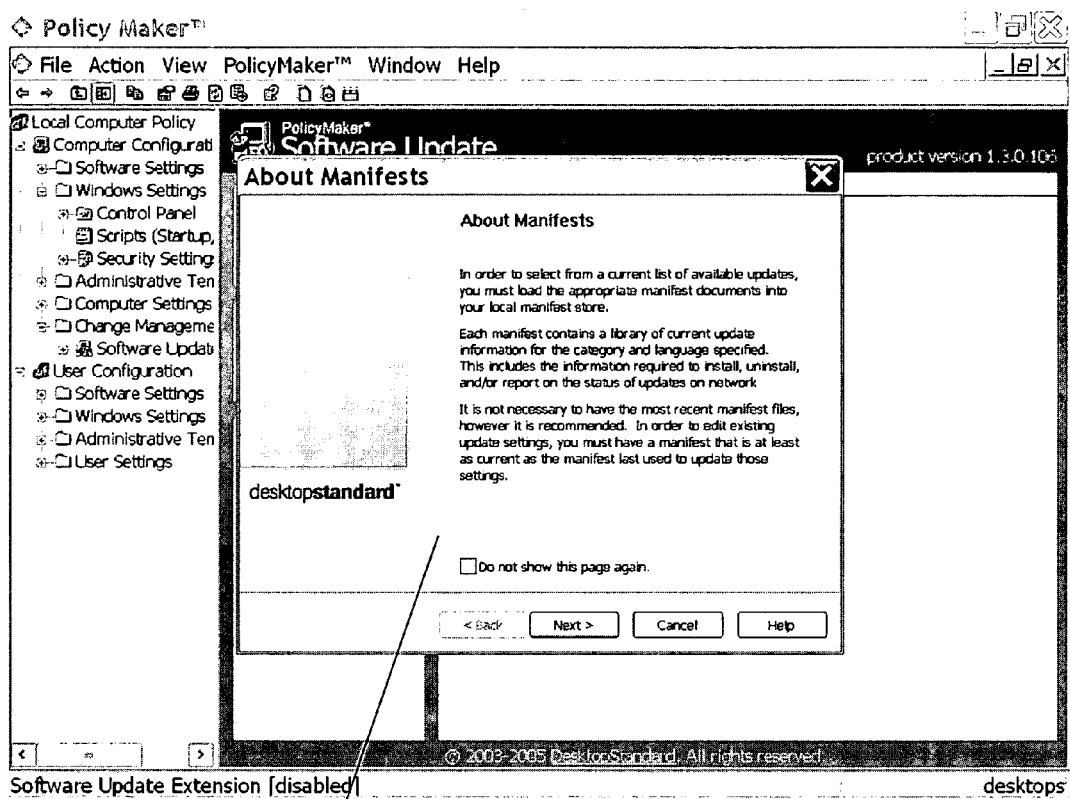
FIG. 2 is a graphical user interface prompting a user to download/update one or more manifests.

FIG. 1 shows a graphical user interface 100 for the software update management program according to a preferred embodiment of the current invention. To begin, the management program queries sources of software updates to determine if any new software updates are available. If a new update or updates are available, the management program downloads criteria for determining whether the update or updates is/are appropriate for a given computer. It also typically downloads metadata from the source of the newly available update or updates. The metadata describes the software update, and typically includes, among other things, information that gives the network location of the software update, the versions of the software the update applies to, a textual description of the update and the changes it will make to the software, a level of importance, information about whether the update supersedes any previous updates, the size of the update file, whether the update requires the system to be rebooted, and whether the update may be uninstalled after it has been installed. In a preferred embodiment, metadata includes all of the information described above. The source of a software update may include, but is not limited to, the producer of the software or a vendor of the software. The metadata may be contained in a manifest, a storage structure for metadata of one or more software updates. In a preferred embodiment, an administrator or other user is prompted to download one or more manifests, or to update one or more manifests previously downloaded, as shown in the graphical user interface 102 of FIG. 2. In a preferred embodiment, to update existing policy settings related to software updates, the manifest must be at least as current as the manifest used to establish or previously update those policy settings. The metadata, whether from one or more manifests or another source, is placed in a store on the network that is locally accessible by the management program.

After the metadata is downloaded, the management program translates the metadata for display by the graphical user interface 100. The translated metadata is placed into a data format, such as the XML data schema described above, for use by the management program. For each software update described by metadata, the management program creates an identifier to be displayed. For example, the identifier may be the name given to the update by the update source. The graphical user interface 100 displays the identifiers in a list, which is both sortable and searchable according to information contained within the metadata. The graphical user interface 100 also displays, in column format, some of the information contained in the metadata. The display also includes panels for showing information about an update that has been selected, such as the identifiers of updates related to the selected update, network locations of further descriptions of the update, and summary details of the update. These panels may be displayed or hidden, according to the administrator or other user's input.

In addition to creating an identifier for each software update and displaying information contained in the metadata of each software update, the management program also interprets and applies a filtering scheme based on the metadata. For example, for all software updates that metadata identifies as being capable of being applied to the Windows XP® operating system, Service Pack 1, the management program includes, in a policy object, filter criteria indicating to the policy management system that any policy including the update should be applied only to computers that are running Windows XP®, Service Pack 1. The metadata will also identify the current state of the software that the update applies to. For example, some updates will build on previous updates, so the metadata identifies those previous updates that must have been previously installed for the current update to be used. In the example of Windows XP®, Service Pack 1, the metadata will identify that a security update released on Mar. 15, 2005, should be installed only on those machines running Windows XP®, Service Pack 1, that have the updates of Mar. 10, 2005 already installed.

Figure 3:
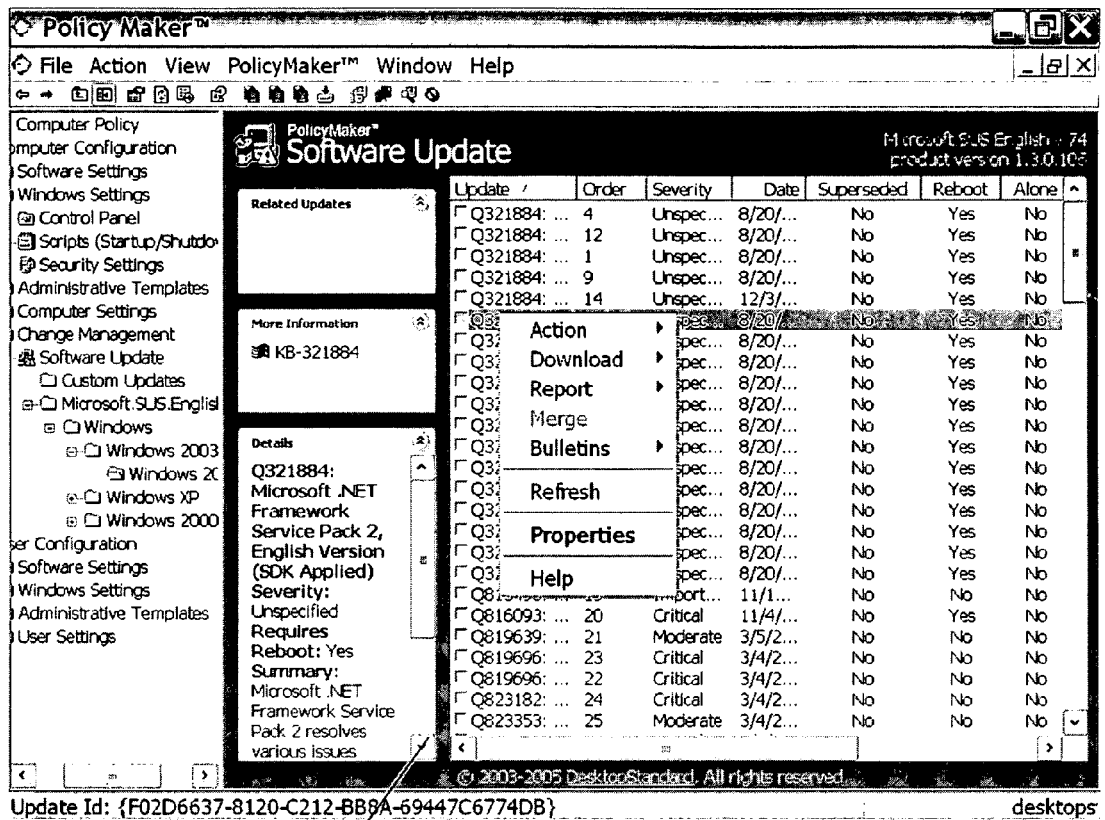
FIG. 3 is a graphical user interface where an identifier of a software update has been selected, and management options and other commands are available to an administrator or user.

Before selecting an update or updates to be managed, the administrator or other user must select a policy object to add policies to, remove policies from, or modify the existing policies contained within the object. This selection may be done in the graphical user interface 100. After a policy object has been selected, and the list of identifiers of software updates and information concerning those updates have been displayed in the graphical user interface 100, the administrator or other user is able to select an update or updates to be managed. The administrator selects the identifier of each software update to be managed; in a preferred embodiment, the administrator right clicks on the identifier and selects one of the management options from the list presented, as shown in the graphical user interface 104 of FIG. 3. Management options include, but are not limited to, install, uninstall, report, disable, and applying/modifying a filter/filters.

Choosing a management option to be applied to the update causes the management program to change the currently selected policy object. If the management option is install, uninstall, or report, the management program will change the policy object to include a new policy. The new policy corresponds to the selected update, and includes the translated metadata that describes the selected update. If the management option is disable, the management program will change the policy object to remove the policy that corresponds to the selected update, and thus removes its translated metadata. If the policy object already contained a policy corresponding to the selected update, choosing install, uninstall, or report will modify the policy to reflect the new management option chosen.

Though the management program adds a filtering scheme to the policy object based on update criteria obtained from the update source, it is possible for an administrator or other user to include a further criterion/criteria as part of the filtering scheme. Such user-defined criteria may be added after the policy corresponding to an update has been added to the policy object. In a preferred embodiment, there is provided a point-and-click filter graphical user interface 106, shown in FIG. 4, that facilitates a drag and drop of user-defined filter criteria within a single user-defined filter control, a drag and drop of user-defined filter elements between filter controls from other policies, a standardized per filter naming and documentation capability, a generalized automatic generation of environment variable with filter results, standardized tracing, event logging and reporting, standardized Boolean operators (and/or/not) applied to filters, indefinite level of nesting to graphically represent logical parenthetic expressions, integration with Windows environment variables (read/write), an ability to generate environment variables for use in follow-on filters or configurations, and a hidden filter capability that allows configuration items to transparently leverage the filter system without presenting those generated filters to administrators.

Figure 4:
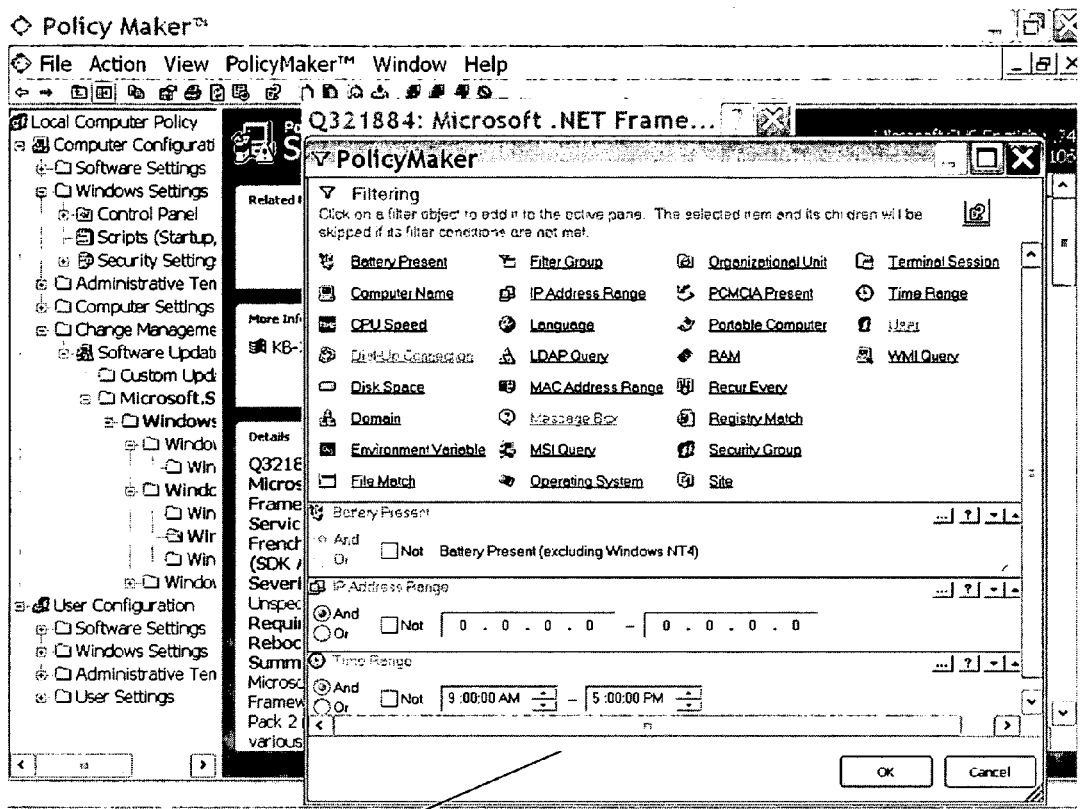
FIG. 4 is a filter graphical user interface, showing options available for adding administrator-defined filter criteria to a policy or policy object.

The filter graphical user interface 106 of FIG. 4 facilitates the selection of filter criteria in a manner that allows a system administrator or another to perform actions such as drag-and-drop to add/remove filter criteria from the policy. Some filter criteria may include, but are not limited to, Battery Present, Computer Name, CPU Present, Dial-Up Connection, Disk Space, Domain, Environment Variables, File match, Filter Group, IP Address Range, Language, LDAP Query, MAC Address Range, Message Box, MSI Query, Operating System, Organizational Unit, PCMCIA Present, Portable Computer, Processing Mode, RAM, Recur Every, Registry Match, Security Group, Site, Terminal Session, Time Range, User, and WMI Query. A filter criterion may have various settings depending on the filter criterion type. These filter settings may be modified by the administrator or other user. The user-defined filter criteria are associated with logic to allow for a determination of whether the policy should be applied to a given computer on the network.

When the administrator or other user selects an identifier of a software update to be managed, the administrator or other user is presented with other commands in addition to the management options. These other commands include copying the selected update, printing the data schema of the selected update, refreshing the selected update if changes have been made, displaying further information about the selected update, and accessing the local help file for the management program. The administrator or other user may also instruct the management program to download the update to a repository that is local to the management program. This option is available so that administrators may place updates into a local network repository, or store, for later retrieval by those computers on the network that will be instructed to install the update. The administrator also has the options of stopping the downloading of the update while the downloading is occurring, and deleting the downloaded update from the local repository. When the administrator or other user has an update downloaded to a local repository, for computers to obtain that update from the local repository, the administrator must change a default root policy setting to include the location of the local repository. This root policy setting applies to the entire policy object, and not to individual policies. If the update is later removed from the local repository, the root policy setting must be changed back to its default setting, or computers will report an error when the policies of the group policy are applied and the computers attempt to download updates from a location that does not contain the updates.

As described above, policy objects may be associated with one or more directory containers. These directory containers, which may be domains, sites, or organizational units, are arranged hierarchically: a domain may include within it a plurality of sites, each of which in turn may include a plurality of organizational units. For example, within a company, a domain may encompass each computer that belongs to the company, a site may encompass all of the computers located on a particular floor of the company's building, and an organizational unit may encompass the computers of a particular group within the company, such as the engineering department. A policy object that is associated with each of those containers will have its policies applied to those containers when the policy objects are deployed by the policy management system.

The policy management system includes options to order the policy objects within a container and across containers. This allows an administrator to address the order in which policies from different policy objects are applied, and to address how conflicts between policy objects are resolved. Each directory container includes options, which may be set by the administrator, to enforce the policy objects associated with the container on the computers associated with the container, and to block the policy objects associated with containers that are lower in the hierarchy.

When the administrator has set the policy objects to reflect the settings to be applied to computers on the network, the policy management system prepares to apply the policies. Before a policy is applied to a computer associated with a directory container, the filter criteria obtained from the update source must be run. In addition, if the policy contains any user-defined filter criteria, these criteria must also be run to determine if the computer passes the criteria. If the computer passes the filter criteria, the policy management system is able to apply the policy to the computer. In embodiments of the current invention, application of a policy that corresponds to a software update causes the computer to download and install the update as implemented by a software deployment feature of the operating system or a separate software deployment program.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and nonvolatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single or multiple processor/devices.

The device(s) or computer systems that integrate with the processor(s) may include, for example, a personal computer (s), workstation (e.g., Sun, HP), personal digital assistant (PDA), handheld device such as cellular telephone, laptop, handheld, or another device capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus may be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art. Accordingly, it will be understood that the disclosed methods and systems are not to be limited to the embodiments disclosed herein, may include practices otherwise than specifically described, and are to be interpreted as broadly as allowed under the law.

What is claimed is:

1. A computer system comprising:
    a processor configured to execute computer-executable instructions for performing one or more of the following:
    maintaining group-policy objects with which groups of computers are associated;
    obtaining identities of software updates from a source of software updates that are newly available;
    obtaining from the source of software updates metadata associated therewith, said obtained metadata describing information about each newly available software update, said information including data values each having specific characteristics thereof;
    translating the obtained metadata and the included data values;
    storing the translated metadata in a standard common format, said standard common format including an XML data schema;
    for respective ones of the newly available updates, determining update filter criteria for respective ones of the newly available updates based on the stored metadata, said criteria determining at least one of the following: whether a computer includes software for which the obtained updates are intended and whether the updates have already been applied;
    providing said group-policy objects, the identities of the software updates, and the filter criteria according to the standard common format based on the obtained metadata and the data values, said standard common format displaying the data values for operations and handling in an abstract manner by a user;
    assigning the newly available updates to respective selected ones of the group-policy objects;
    adding, to each group-policy object to which at least one of the updates has thus been assigned, the filter criteria obtained for the assigned update; and
    performing necessary installations of the updates by, for each of the group-policy objects for the assigned updates:
    determining, for each combination of (a) computer belonging to one of the groups associated with that group-policy object and (b) update assigned to the group-policy object, whether the computer satisfies filter criteria that include the update filter criteria obtained from the source for the update; if so, applying the update to the computer; and if not, refraining from applying that update to the computer; and
    a common user interface for displaying values of the group-policy objects and the filter criteria based on the standard common format to the user such that the user can manage the values via the common user interface.

2. The computer system according to claim 1, wherein each group-policy object includes a separate policy for each update that has been assigned to that group-policy object.

3. The computer system according to claim 2, wherein the process is further configured to respond to user input to add to the filter criteria at least one user-defined filter criterion.

4. The computer system according to claim 3, wherein if another computer satisfies the filter criteria for another update, the update that is applied to that computer is retrieved from a local repository.

5. The computer system according to claim 1, software configured to respond to user input to trigger the assignment of such newly available updates to respective selected ones of group-policy objects.

6. The computer system according to claim 1, software configured to respond to user input to trigger obtaining from another source of software updates: the identities of software updates that are newly available; and for respective ones of such updates, corresponding update filter criteria for determining whether another computer includes software for which those updates are intended and for determining whether the updates have already been applied.

7. The computer system according to claim 1, further software configured to respond to user input to add to the filter criteria at least one user-defined filter criterion.

8. The computer system according to claim 1, software configured to further obtain from the source of software updates: metadata describing each newly available software update.

9. The computer system according to claim 1, wherein if another computer satisfies the filter criteria for another update, the update that is applied to that computer is retrieved from a local repository.

* * * * *